United States Patent
Kim et al.

(10) Patent No.: US 7,953,178 B2
(45) Date of Patent: May 31, 2011

(54) APPARATUS AND METHOD FOR DETECTING SIGNAL IN A BROADBAND WIRELESS ACCESS SYSTEM

(75) Inventors: Do-Young Kim, Yongin-si (KR); Hak-Ju Lee, Incheon (KR); Dong-Seek Park, Yongin-si (KR); Sung-Kwon Hong, Seoul (KR); Chang-Ho Suh, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1016 days.

(21) Appl. No.: 11/800,024

(22) Filed: May 3, 2007

(65) Prior Publication Data

US 2007/0258530 A1    Nov. 8, 2007

(30) Foreign Application Priority Data

May 3, 2006    (KR) .................. 10-2006-0039821

(51) Int. Cl.
*H04K 1/02*    (2006.01)
*H04L 25/49*    (2006.01)
(52) U.S. Cl. .................. 375/296; 375/299; 375/259
(58) Field of Classification Search .................. 375/260, 375/261, 150, 145, 295; 455/101, 103, 136, 455/273, 295
See application file for complete search history.

(56) References Cited

U.S. PATENT DOCUMENTS

| 5,335,359 A * | 8/1994 | Tsujimoto et al. ............. 455/506 |
| 7,006,461 B2 | 2/2006 | Kilfoyle et al. |
| 2001/0004585 A1* | 6/2001 | Tsujimoto .................. 455/101 |
| 2002/0089978 A1 | 7/2002 | Wang et al. |
| 2003/0067975 A1* | 4/2003 | Yamakura et al. ............. 375/233 |
| 2003/0171128 A1* | 9/2003 | Tandai et al. .................. 455/502 |
| 2004/0258138 A1* | 12/2004 | Oishi et al. .................... 375/142 |
| 2006/0045003 A1* | 3/2006 | Choi et al. .................... 370/208 |
| 2007/0104297 A1* | 5/2007 | Gorday .......................... 375/343 |
| 2007/0153761 A1* | 7/2007 | Fechtel .......................... 370/350 |
| 2008/0285631 A1* | 11/2008 | Shattil .......................... 375/148 |
| 2009/0245220 A1* | 10/2009 | Dick et al. .................... 370/342 |

FOREIGN PATENT DOCUMENTS

| KR | 1020020064575 | 8/2002 |
| KR | 1020040079075 | 9/2004 |

* cited by examiner

*Primary Examiner* — Chieh M Fan
*Assistant Examiner* — Qutbuddin Ghulamali
(74) *Attorney, Agent, or Firm* — The Farrell Law Firm, P.C.

(57) ABSTRACT

An apparatus and method for signal detection in a Broadband Wireless Access (BWA) system are provided, in which in a transmitter, a first preamble sequence generator generates preamble sequences, a low-Peak-to-Average Power Ratio (PAPR) preamble sequence selector selects a first low-PAPR preamble sequence from among the generated preamble sequences, a preamble sequence copier copies the first low-PAPR preamble sequence at least once and outputs the first low-PAPR preamble sequence and the at least one copy, a complex conjugator generates preamble sequences orthogonal to the first low-PAPR preamble sequence and the at least one copy by calculating complex conjugates of the first low-PAPR preamble sequence and the at least one copy, and a second preamble sequence generator generates at least one second low-PAPR preamble sequence using the first low-PAPR preamble sequence.

11 Claims, 13 Drawing Sheets

APPARATUS AND METHOD FOR DETECTING SIGNAL IN A BROADBAND WIRELESS ACCESS SYSTEM

PRIORITY

This application claims priority under 35 U.S.C. §119 to an application filed in the Korean Intellectual Property Office on May 3, 2006 and assigned Serial No. 2006-39821, the contents of which are incorporated herein by reference.

BACKGROUND OF THE INVENTION

1. Field of the Invention

The present invention relates generally to a Broadband Wireless Access (BWA) system, and in particular, to an apparatus and method for identifying a Relay Station (RS) or a Base Station (BS) by its orthogonal preamble signal with a low Peak-to-Average Power Ratio (PAPR) in a system having 1-hop RSs or multi-hop RSs. The present invention also relates to an apparatus and method for generating another preamble signal using a preamble signal.

2. Description of the Related Art

Provisioning of services with diverse Quality of Service (QoS) requirements at or above 100 Mbps to users is an active study area for the $4^{th}$ Generation (4G) communication system. Particularly, active research is being conducted on providing high-speed service by ensuring mobility and QoS to a BWA communication system such as Wireless Local Area Network (WLAN) and Wireless Metropolitan Area Network (WMAN). Such major examples are Institute of Electrical and Electronics Engineers (IEEE) 802.16a and IEEE 802.16e.

The IEEE 802.16a and IEEE 802.16e communication systems adopt Orthogonal Frequency Division Multiplexing/Orthogonal Frequency Division Multiple Access (OFDM/OFDMA) for physical channels in order to support a broadband transmission network. IEEE 802.16a considers only a single-cell structure with no regard to mobility of Subscriber Stations (SSs). In contrast, IEEE 802.16e supports the SS's mobility to the IEEE 802.16d communication system. Hereinafter, a mobile SS will be referred to as an MS.

In general, since a BS and an MS communicate with each other via a direct link, a highly reliable radio link can easily be established between them in the IEEE 802.16e communication system. However, due to the fixedness of the BSs, the configuration of a wireless network is not flexible, making it difficult to provide an efficient service in a radio environment experiencing a fluctuating traffic distribution and a substantial change in the number of required calls. The above drawback can be overcome by a relay service that delivers data over multiple hops using MSs or fixed or mobile RSs. The use of the multi-hop relay scheme expands cell coverage.

FIG. 1 illustrates the configuration of a conventional BWA communication system using RSs.

Referring to FIG. 1, the BWA communication system is configured in a multi-cell structure. Specifically, it includes cells 100 and 140, BSs 110 and 150 for managing the respective cells 100 and 140, a plurality of MSs 111, 113, 151, 153 and 155 within the cells 100 and 140, a plurality of MSs 121, 123, 161 and 163 under management of the BSs 110 and 150 but in areas 130 and 170 outside the cells 100 and 140, and RSs 120 and 160 for providing relay paths between the BSs 110 and 150 and the MSs 121, 123, 161 and 163 in the areas 130 and 170. Signaling is carried out in OFDM/OFDMA between the BSs 110 and 150 and the MSs 111, 113, 121, 123, 151, 153, 155, 161 and 163. Although the MSs 111 and 113 and the RS 120 within the cell 100 can communicate directly with the BS 110, the MSs 121 and 123 in the area 130 cannot communicate directly with the BS 110. Therefore, the RS 120 covers the area 130 and relays signals between the BS 110 and the MSs 121 and 123. In other words, the MSs 121 and 123 can send and receive signals to and from the BS 110 via the RS 120.

Although the MSs 151, 153 and 155 and the RS 160 within the cell 140 can communicate directly with the BS 150, the MSs 161 and 163 in the area 170 cannot communicate directly with the BS 150. Therefore, the RS 160 covers the area 170 and relays signals between the BS 150 and the MSs 161 and 163. In other words, the MSs 161 and 163 can send and receive signals to and from the BS 150 via the RS 160.

In the OFDM communication system, an MS acquires frequency synchronization and frame synchronization from a BS and an RS and identifies them by their preamble signals.

However, since data is sent on a plurality of subcarriers, the amplitude of a final OFDM signal can be expressed as the sum of the amplitudes of the subcarriers. If the subcarriers are at the same phase, the OFDM signal has a very high PAPR. In general, the signal with the very high PAPR is beyond the linear operation range of an amplifier and thus experiences distortion after passing through the amplifier. As a result, the high-PAPR signal not only decreases the efficiency of a linear amplifier but also makes the operation point of a non-linear amplifier enter into a non-linear range, thereby causing intermodulation and out-of-band spectrum radiation.

In contrast, a low-PAPR preamble sequence prevents non-linear distortion in a High Power Amplifier (HPA), thus leading to high-quality signal transmission and highly efficient power amplification. A typical OFDM communication system generates a plurality of low-PAPR preamble sequences, but the number of low-PAPR preamble sequences is limited.

Accordingly, there exists a need for an apparatus and method for generating a low-PAPR preamble sequence with orthogonality and generating an additional low-PAPR preamble sequence using the low-PAPR preamble sequence, for use in a BS and an RS.

SUMMARY OF THE INVENTION

An object of the present invention is to substantially solve at least the above problems and/or disadvantages and to provide at least the advantages below. Accordingly, an object of the present invention is to provide an apparatus and method for identifying a BS and RS by low-PAPR orthogonal preamble signals.

Another object of the present invention is to provide an apparatus and method for generating an additional preamble sequence orthogonal to a low-PAPR preamble sequence.

In accordance with the present invention, there is provided a transmitter for signal detection in a BWA system, in which a first preamble sequence generator generates preamble sequences, a low-PAPR preamble sequence selector selects a first low-PAPR preamble sequence from among the generated preamble sequences, a preamble sequence copier copies the first low-PAPR preamble sequence at least once and outputs the first low-PAPR preamble sequence and the at least one copy, a complex conjugator generates preamble sequences orthogonal to the first low-PAPR preamble sequence and the at least one copy by calculating complex conjugates of the first low-PAPR preamble sequence and the at least one copy, and a second preamble sequence generator generates at least one second low-PAPR preamble sequence using the first low-PAPR preamble sequence.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

Figure 1:
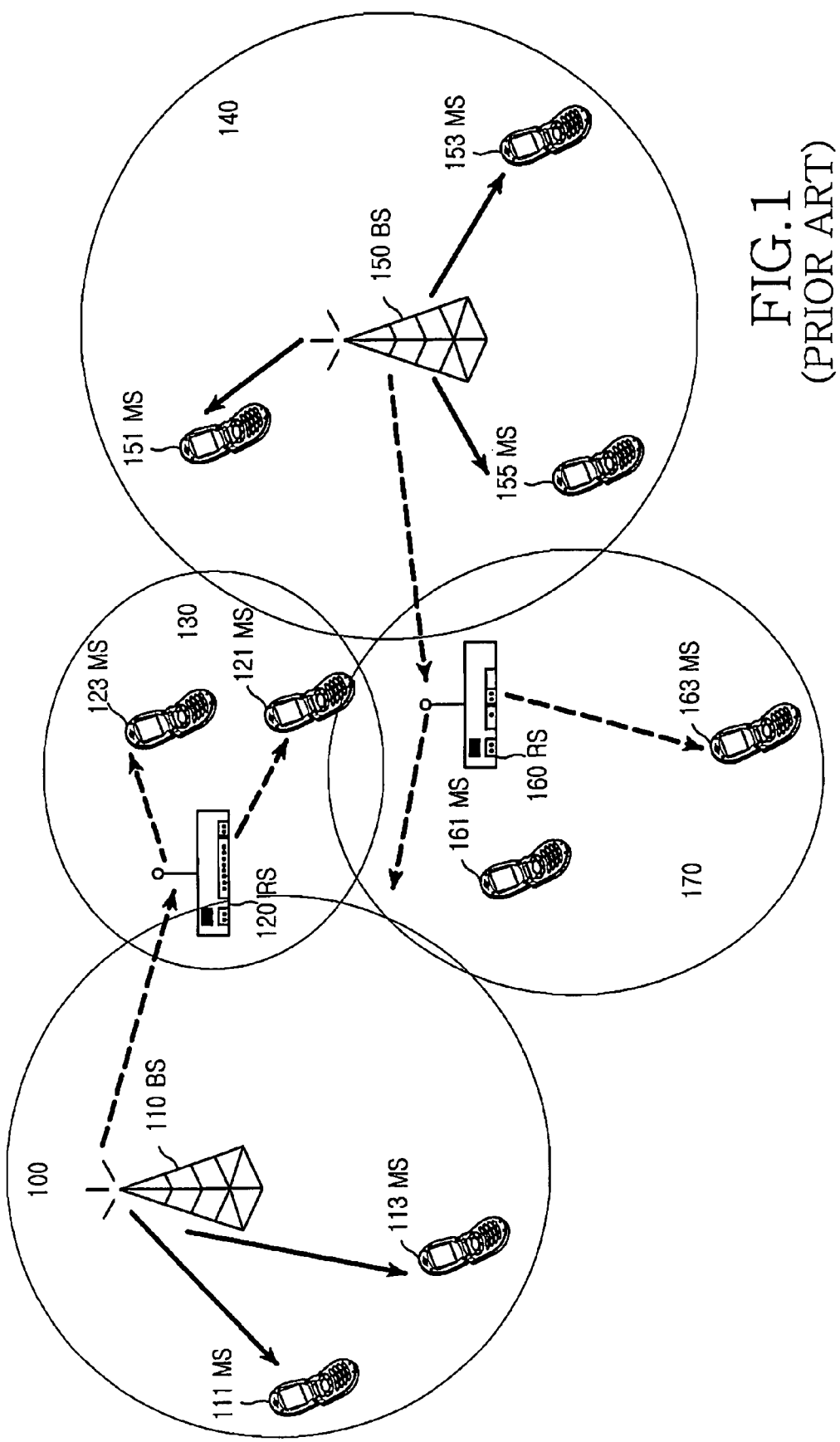
FIG. 1 illustrates the configuration of a conventional BWA communication system using RSs.
Figure 2:
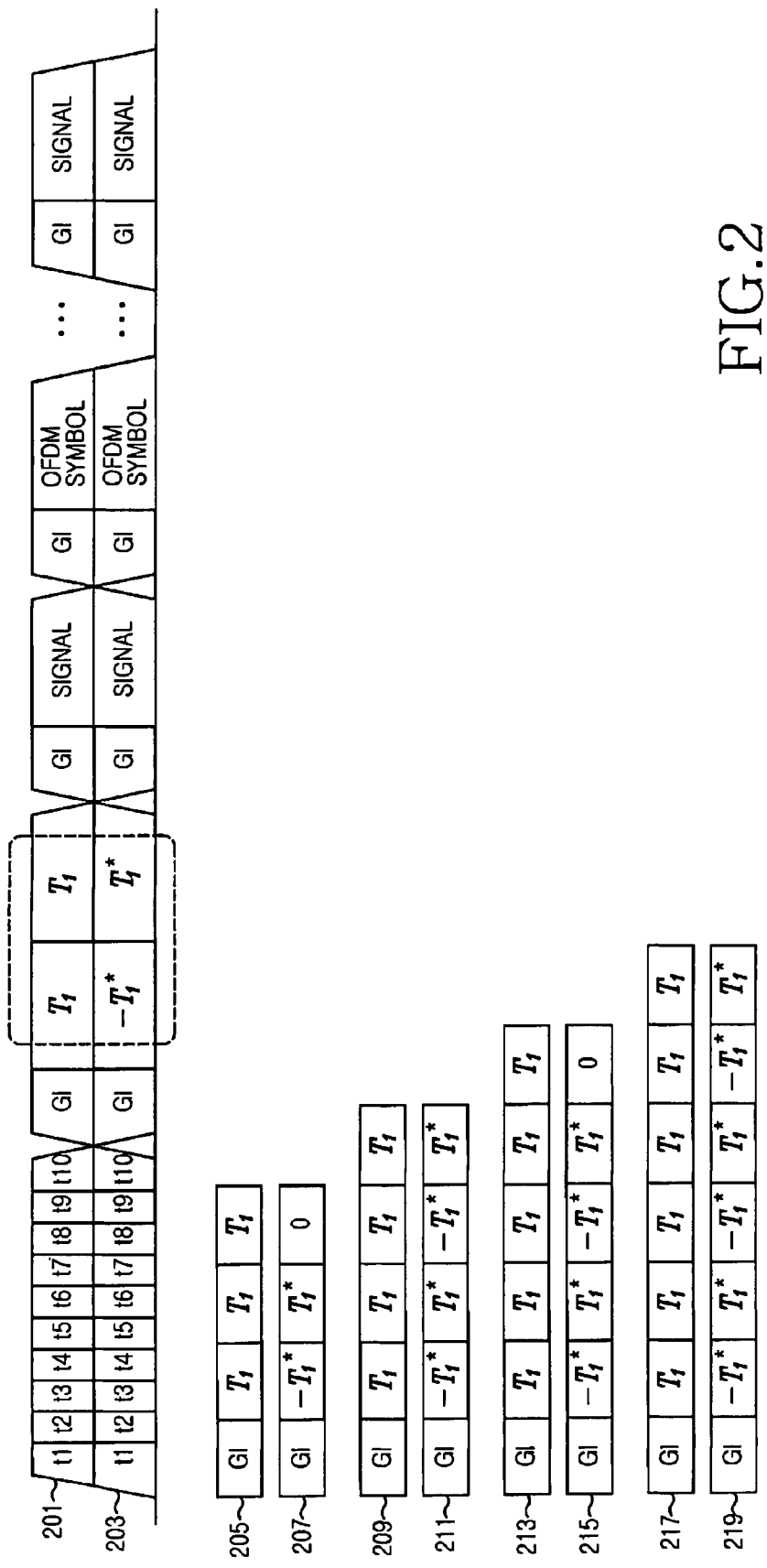
FIG. 2 illustrates a preamble structure and preamble signals according to the present invention.

FIG. 2 illustrates a preamble structure and preamble signals according to the present invention.

Referring to FIG. 2, preamble signals 201 and 203 are mutually orthogonal so that they can be distinguished by the orthogonality. If the preamble signals 201 and 203 are allocated to a BS and an RS, respectively, an MS can identify signals from the BS 110 and the RS 120 by the preamble signals 201 and 203.

The BS generates a low-PAPR preamble sequence $T_1$ and forms a long preamble signal $(T_1, T_1)$, i.e. the preamble signal 201, and the RS forms a long preamble signal $(-T^*_1, T^*_1)$ with complex conjugates of the preamble sequence $T_1$. Thus, the preamble signals 201 and 203 become orthogonal to each other and the MS can identify the BS and the RS based on the orthogonality.

When each preamble signal is formed with two preamble sequences, i.e. in a preamble pattern of 2, these preamble signals 201 and 203 can be expressed in Equation (1) as $$preamble_2 = \begin{pmatrix} T_1 & T_1 \\ -T^*_1 & T^*_1 \end{pmatrix} \quad (1)$$

where T denotes a preamble sequence.

For extended preamble patterns, the preamble signals are given as follows.

In a preamble pattern of 3, preamble signals 205 and 207 are expressed in Equation (2) as $$preamble_3 = \begin{pmatrix} T_1 & T_1 & T_1 \\ -T^*_1 & T^*_1 & 0 \end{pmatrix} \quad (2)$$

In a preamble pattern of 4, preamble signals 209 and 211 are expressed in Equation (3) as $$preamble_4 = \begin{pmatrix} T_1 & T_1 & T_1 & T_1 \\ -T^*_1 & T^*_1 & -T^*_1 & T^*_1 \end{pmatrix} \quad (3)$$

In a preamble pattern of 5, preamble signals 213 and 215 are expressed in Equation (4) as $$preamble_5 = \begin{pmatrix} T_1 & T_1 & T_1 & T_1 & T_1 \\ -T^*_1 & T^*_1 & -T^*_1 & T^*_1 & 0 \end{pmatrix} \quad (4)$$

In a preamble pattern of 6, preamble signals 217 and 219 are expressed in Equation (5) as $$preamble_6 = \begin{pmatrix} T_1 & T_1 & T_1 & T_1 & T_1 & T_1 \\ -T^*_1 & T^*_1 & -T^*_1 & T^*_1 & -T^*_1 & T^*_1 \end{pmatrix} \quad (5)$$

As noted from Equations (2) to (5), even when the preamble pattern is extended, the orthogonality is still maintained. The orthogonality in the extended preamble patterns is shown in FIGS. 7 to 10.

The extension of preamble patterns is explained as follows.

For a preamble pattern of an even number equal to or greater than 4, i.e. 4 or a greater even number of preamble sequences in a preamble signal, the preamble signals are given in Equation (6) as $$\text{If } A = \begin{pmatrix} T_1 & T_1 \\ -T^*_1 & T^*_1 \end{pmatrix}, preamble_n = (A \ \ldots \ )$$

where T denotes a preamble sequence, n is an even number equal to or greater than 4, and A occurs a half of n times.

For example, for n=4, the preamble pattern in Equation (7) is $$preamble_4 = \begin{pmatrix} T_1 & T_1 & T_1 & T_1 \\ -T_1^* & T_1^* & -T_1^* & T_1^* \end{pmatrix} \quad (7)$$

For a preamble pattern of an odd number equal to or greater than 5, i.e. 5 or a greater odd number of preamble sequences in a preamble signal, the preamble signals are given in Equation (8) as $$\text{If } A = \begin{pmatrix} T_1 & T_1 \\ -T_1^* & T_1^* \end{pmatrix}, preamble_n = \begin{pmatrix} A & \cdots & T_1 \\ & & 0 \end{pmatrix} \quad (8)$$

where T denotes a preamble sequence, n is an odd number equal to or greater than 5, and A occurs a half of (n−1) times.

For example, for n=5, the preamble pattern in Equation (9) is $$preamble_5 = \begin{pmatrix} T_1 & T_1 & T_1 & T_1 & T_1 \\ -T_1^* & T_1^* & -T_1^* & T_1^* & 0 \end{pmatrix} \quad (9)$$

Figure 3:
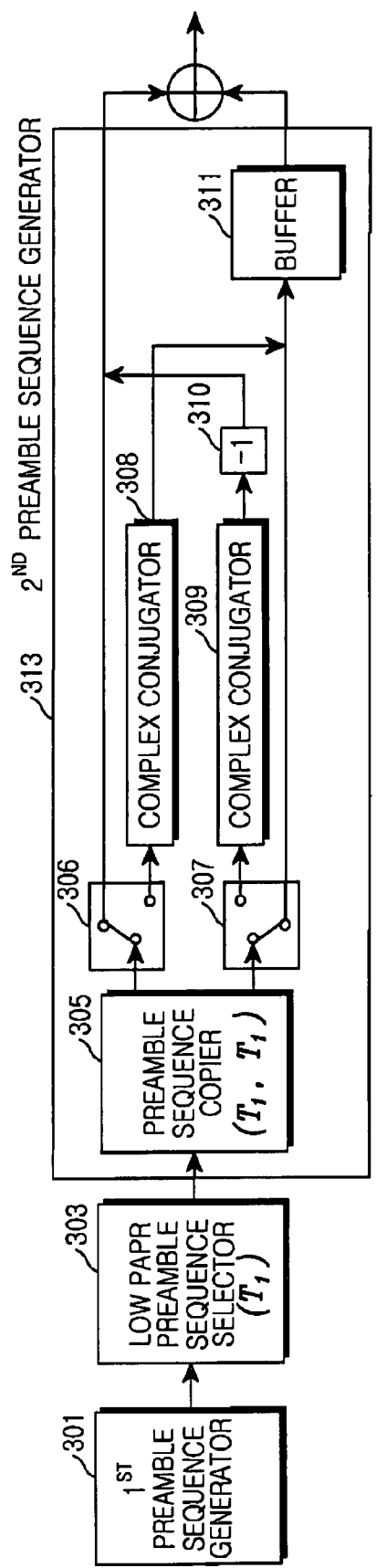
FIG. 3 is a block diagram of a transmitter for generating orthogonal preamble sequences according to the present invention.

FIG. 3 is a block diagram of a transmitter for generating orthogonal preamble sequences according to the present invention.

Referring to FIG. 3, a first preamble sequence generator 301 generates preamble sequences. A low-PAPR preamble sequence selector 303 selects a low-PAPR preamble sequence among from the preamble sequences.

A preamble sequence copier 305 copies the low-PAPR preamble sequence. One of the low-PAPR preamble sequence and its copy is delayed in a buffer 311. Then the low-PAPR preamble sequence and its copy are used as a long preamble of a downlink frame sent from a BS or an RS. The long preamble can be used for sending node identification, frame synchronization, cell search, frequency offset estimation and channel estimation in the BWA communication system.

A second preamble sequence generator 313 generates a preamble sequence orthogonal to the low-PAPR preamble sequence.

The second preamble sequence generator 313 includes the preamble sequence copier 305, switches 306 and 307, complex conjugators 308 and 309, a sign converter 310 and the buffer 311. When the second preamble sequence generator 313 generates the preamble sequence orthogonal to the low-PAPR preamble sequence generated from the first preamble sequence generator 301, the switches 306 and 307 select a different path from that for the preamble sequence generation of the first preamble sequence generator 301.

The complex conjugators 308 and 309, the sign converter 310 and the buffer 311 generate orthogonal preamble sequences by complex-conjugation, sign conversion and delaying of the low-PAPR preamble sequence and its copy received from the switches 306 and 307.

The orthogonal preamble sequences can be used as a long preamble signal of a downlink frame sent from the BS or the RS. The long preamble can be used for sending node identification, frame synchronization, cell search, frequency offset estimation and channel estimation in the BWA communication system.

Figure 4:
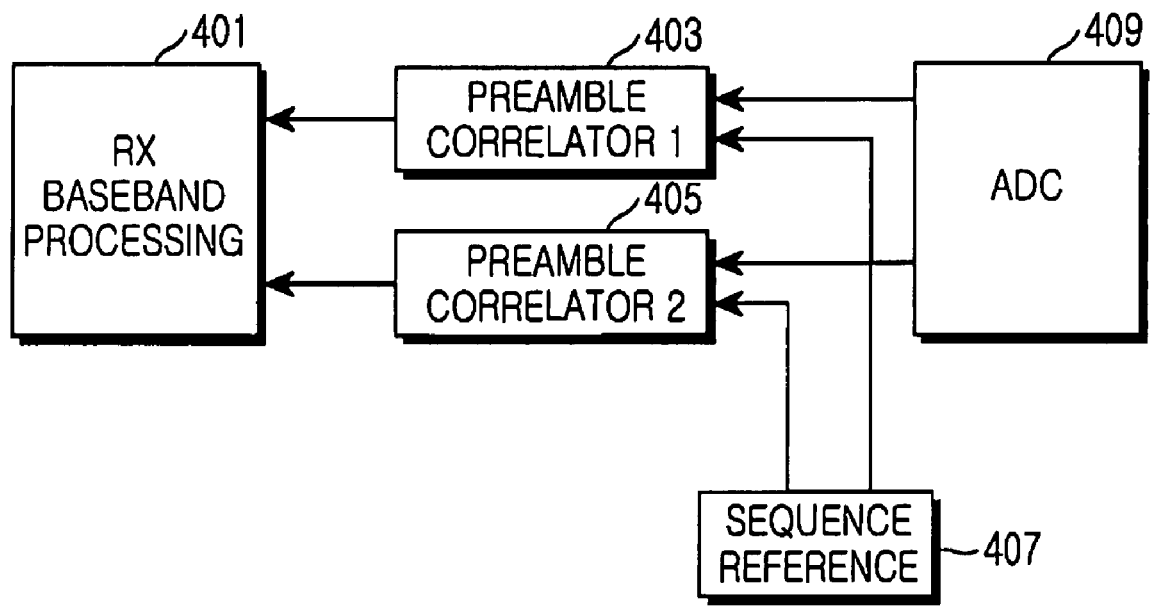
FIG. 4 is a block diagram of an MS for extracting an orthogonal preamble signal by use of a preamble correlator according to the present invention.

FIG. 4 is a block diagram of an MS for extracting an orthogonal preamble signal by use of a preamble correlator according to the present invention.

Referring to FIG. 4, the MS processes a signal received through a Radio Frequency (RF) module and an Analog-to-Digital Converter (ADC) 409.

The MS acquires a preamble signal from the received signal, identifies whether the sending node of the signal is a BS or an RS, acquires synchronization to the sending node and converts the signal to a baseband signal.

A first preamble correlator 403 (preamble correlator 1) acquires synchronization to the BS using a preamble signal received from the BS, and a second preamble correlator 405 (preamble correlator 2) acquires to the RS synchronization using a preamble signal received from the RS. That is, if the received signal is from the BS, the first preamble correlator 403 acquires synchronization to the BS, and if the received signal is from the RS, the second preamble correlator 405 acquires synchronization to the RS.

Information about the preamble signals of the BS and the RS are stored in a sequence reference block 407, for use in signal synchronization to the BS and the RS in the first and second preamble correlators 403 and 405.

The preamble sequence information may be preset or received before the synchronization.

A baseband processor 401 downconverts the signals received from the first and second preamble correlators 403 and 405 to baseband signals. Then the baseband signals are subject to demodulation and decoding.

Figure 5:
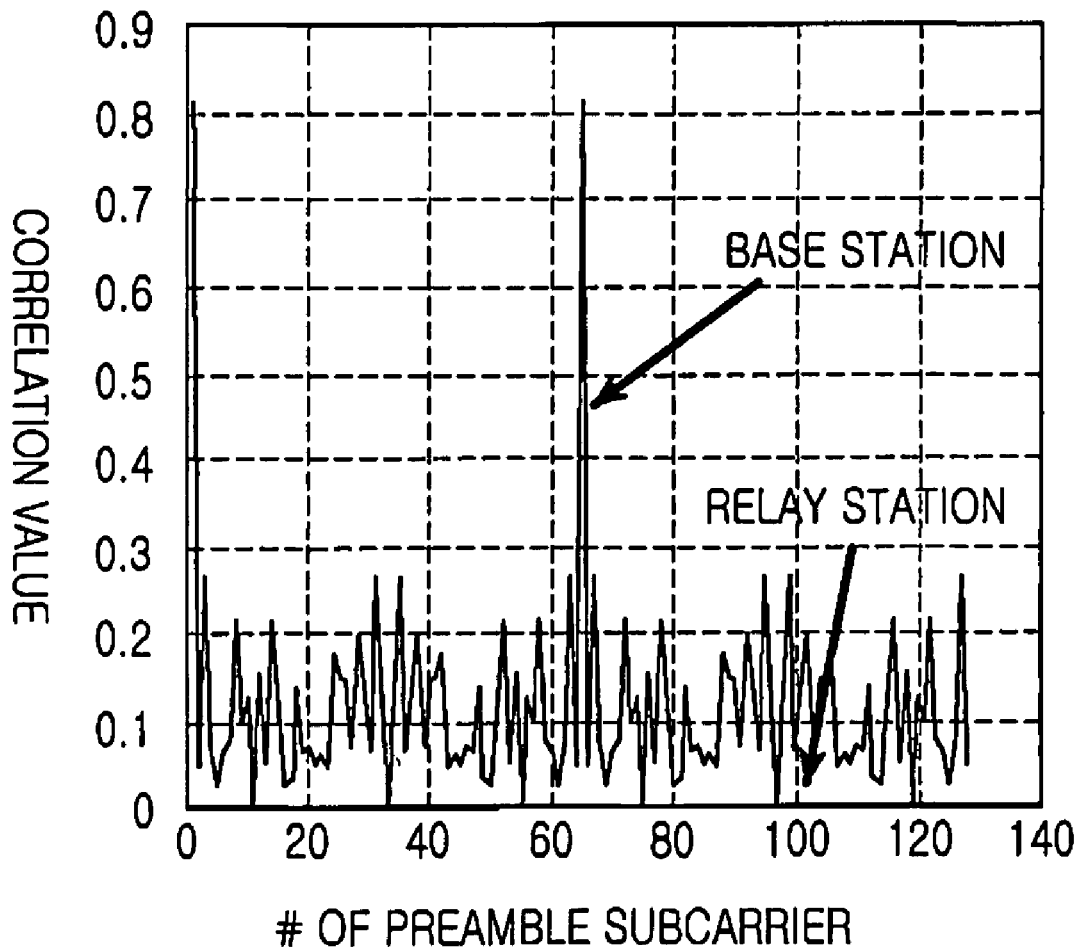
FIG. 5 illustrates correlation values output from a first preamble correlator according to the present invention, when a preamble signal is formed with two preamble sequences.

FIG. 5 illustrates correlation values output from the first preamble correlator 403 in a preamble pattern of 2 according to the present invention.

Referring to FIG. 5, when the MS receives a signal from the BS, the first preamble correlator 403 identifies the BS by correlating the signal with the preamble sequence of the BS. When the MS receives a signal from the RS, the correlation between the received signal and the preamble sequence of the BS is 0 in the first preamble correlator 403. Therefore, even though the MS receives signals from the BS and the RS simultaneously, it can distinguish the signals.

Figure 6:
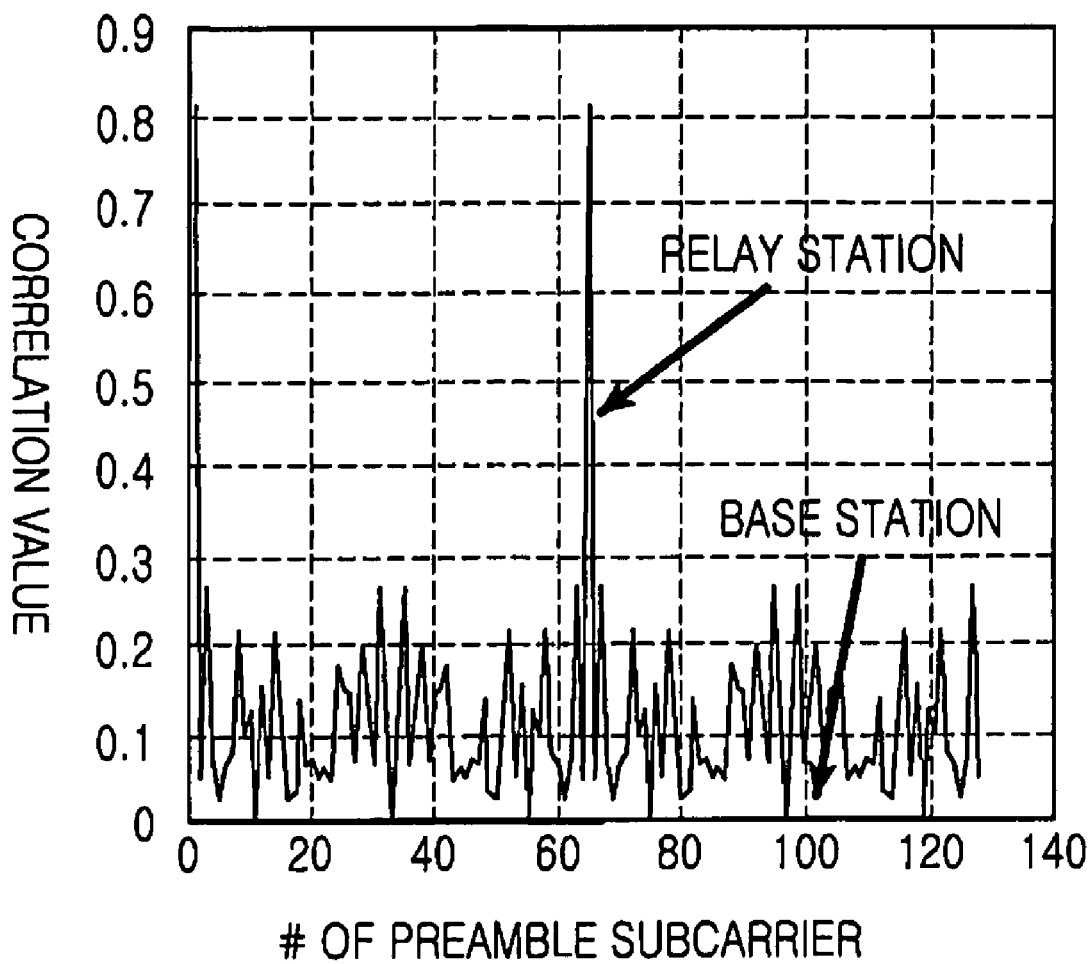
FIG. 6 illustrates correlation values output from a second preamble correlator according to the present invention, when a preamble signal is formed with two preamble sequences.

FIG. 6 illustrates correlation values output from the second preamble correlator 405 in the preamble pattern of 2 according to the present invention.

Referring to FIG. 6, when the MS receives a signal from the RS, the second preamble correlator 405 identifies the RS by correlating the signal with the preamble sequence of the RS. When the MS receives a signal from the BS, the correlation between the received signal and the preamble sequence of the RS is 0 in the second preamble correlator 405. Therefore, even though the MS receives signals from the BS and the RS simultaneously, it can distinguish the signals.

Figure 7:
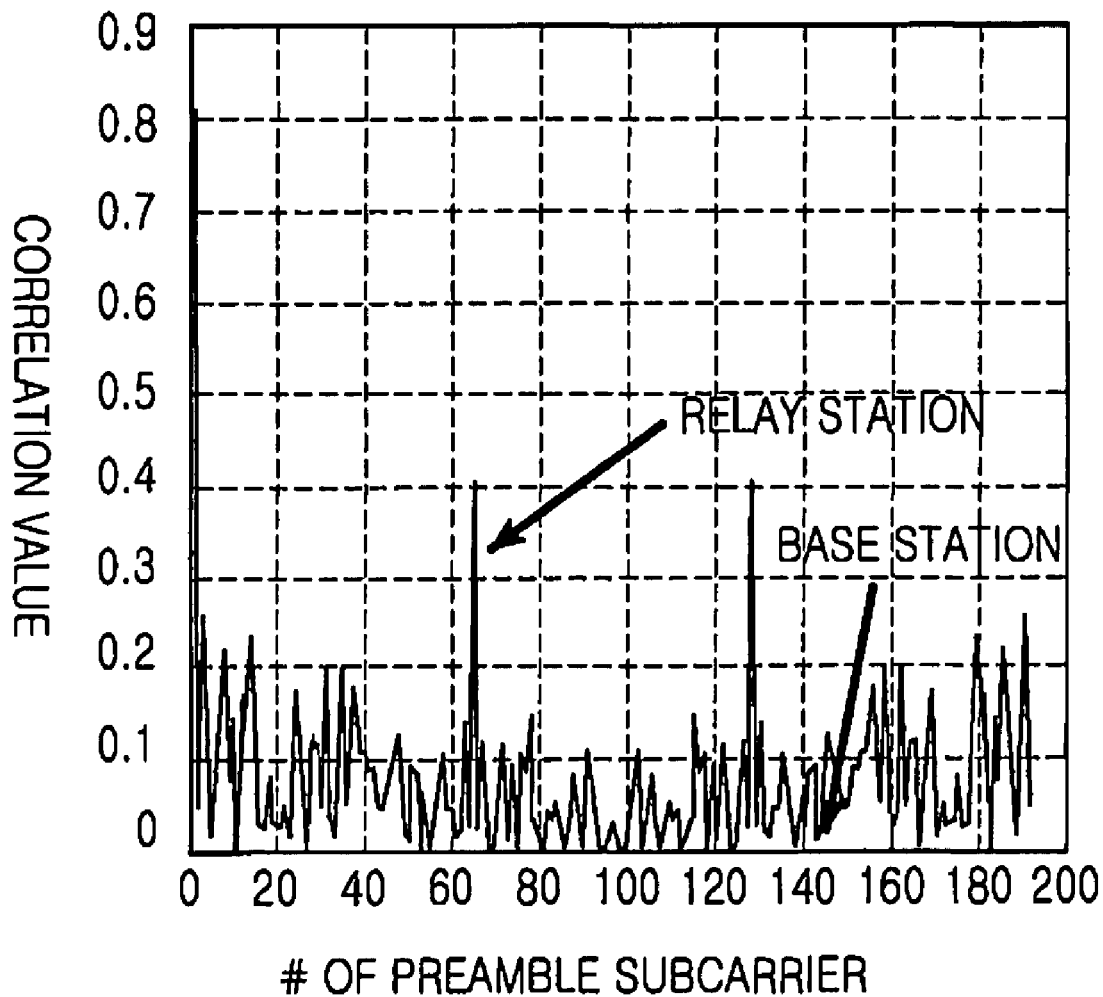
FIG. 7 illustrates correlation values output from the second preamble correlator according to the present invention, when a preamble signal is formed with three preamble sequences.

FIG. 7 illustrates correlation values output from the second preamble correlator 405 in the preamble pattern of 3 according to the present invention.

Referring to FIG. 7, the graph illustrates the correlation between a BS signal and the preamble signal of the RS and the correlation between an RS signal and the preamble signal of the RS calculated in the second preamble correlator 405 signal received signal, when the preamble signals are configured according to the preamble pattern of 3, such as the preamble signals 205 and 207 shown in FIG. 2. For the BS signal, the correlation output from the second preamble correlator 405 is 0. Therefore, even though the MS receives signals from the BS and the RS simultaneously, it can distinguish the signals.

Figure 8:
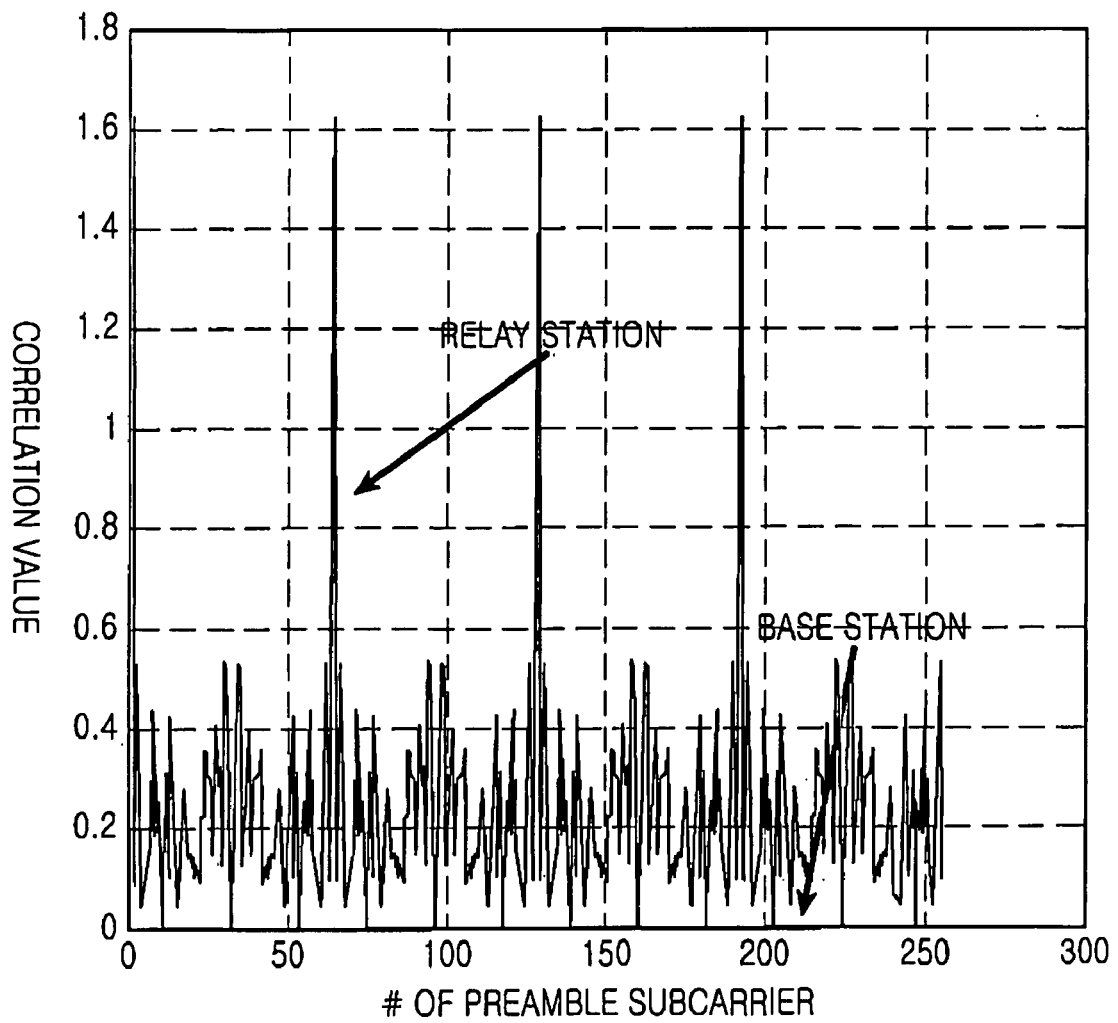
FIG. 8 illustrates correlation values output from the second preamble correlator according to the present invention, when a preamble signal is formed with four preamble sequences.

FIG. 8 illustrates correlation values output from the second preamble correlator 405 in the preamble pattern of 4 according to the present invention.

Referring to FIG. 8, the graph illustrates the correlation between a BS signal and the preamble signal of the RS and the correlation between an RS signal and the preamble signal of the RS calculated in the second preamble correlator 405 signal received signal, when the preamble signals are configured according to the preamble pattern of 4, such as the preamble signals 209 and 211 shown in FIG. 2. For the BS signal, the correlation output from the second preamble correlator 405 is 0. Therefore, even though the MS receives signals from the BS and the RS simultaneously, it can distinguish the signals.

Figure 9:
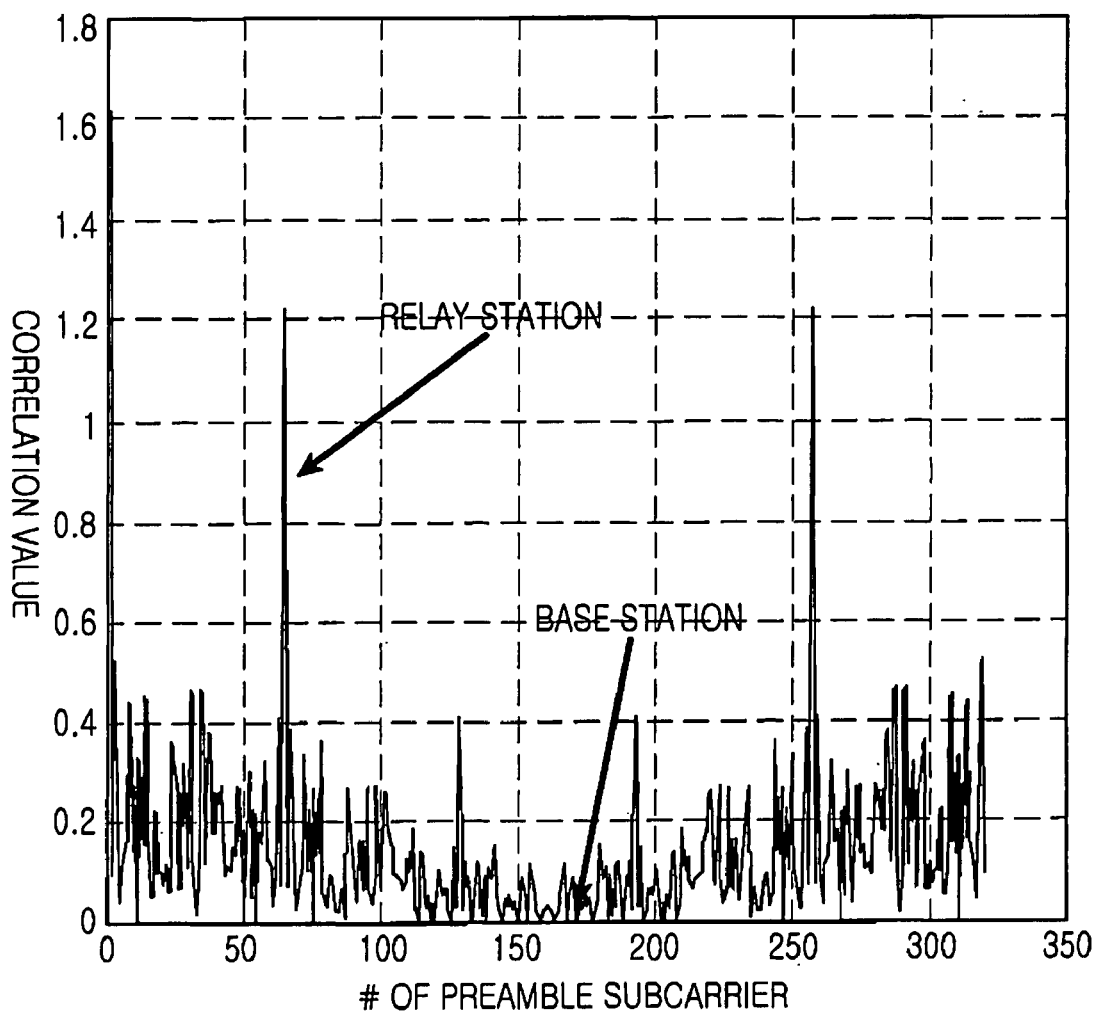
FIG. 9 illustrates correlation values output from the second preamble correlator according to the present invention, when a preamble signal is formed with five preamble sequences.

FIG. 9 illustrates correlation values output from the second preamble correlator 405 in the preamble pattern of 5 according to the present invention.

Referring to FIG. 9, the graph illustrates the correlation between a BS signal and the preamble signal of the RS and the correlation between an RS signal and the preamble signal of the RS calculated in the second preamble correlator 405 signal received signal, when the preamble signals are configured according to the preamble pattern of 5, such as the preamble signals 213 and 215 shown in FIG. 2. For the BS signal, the correlation output from the second preamble correlator 405 is 0. Therefore, even though the MS receives signals from the BS and the RS simultaneously, it can distinguish the signals.

Figure 10:
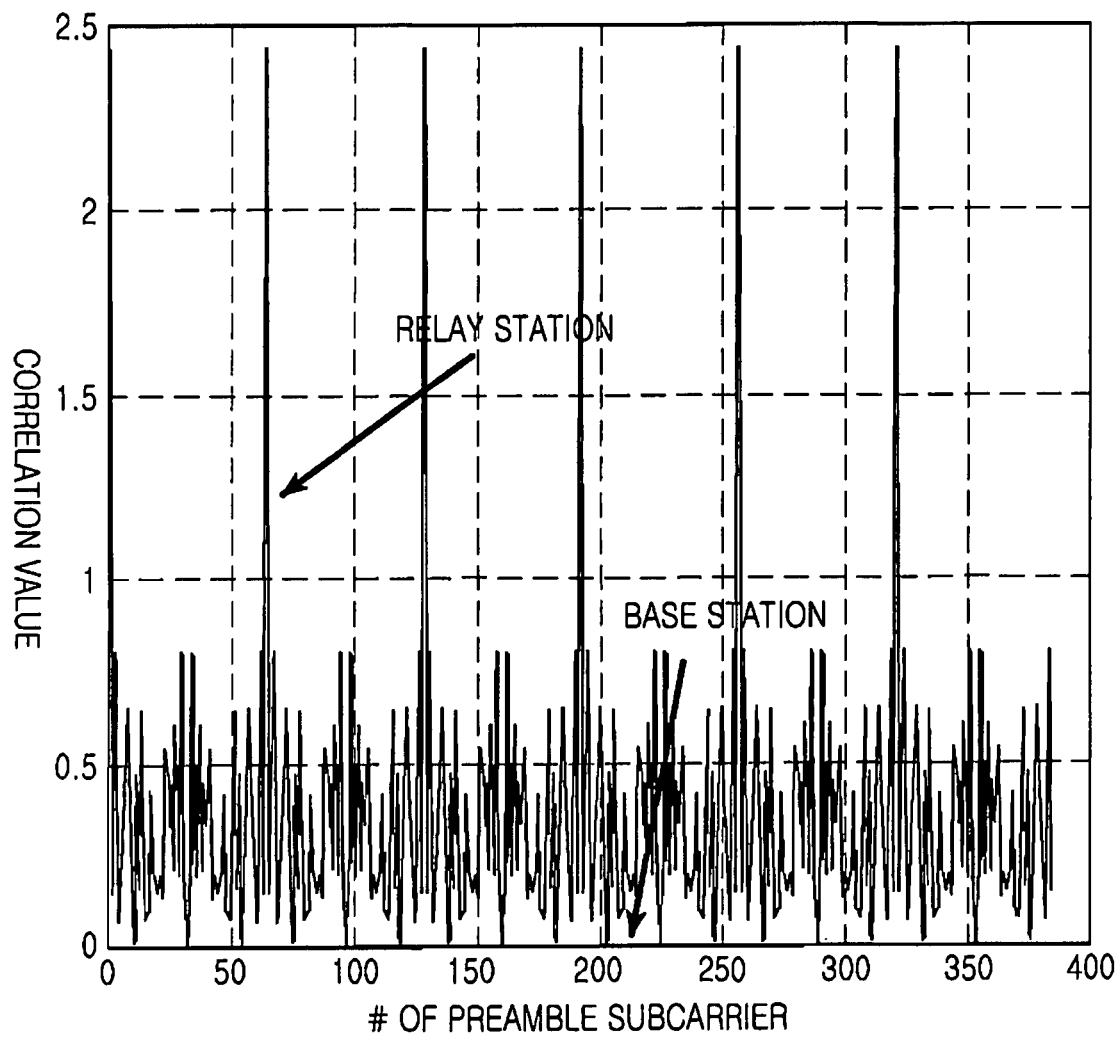
FIG. 10 illustrates correlation values output from the second preamble correlator according to the present invention, when a preamble signal is formed with six preamble sequences.

FIG. 10 illustrates correlation values output from the second preamble correlator 405 in the preamble pattern of 6 according to the present invention.

Referring to FIG. 10, the graph illustrates the correlation between a BS signal and the preamble signal of the RS and the correlation between an RS signal and the preamble signal of the RS calculated in the second preamble correlator 405 signal received signal, when the preamble signals are configured according to the preamble pattern of 6, such as the preamble signals 217 and 219 shown in FIG. 2. For the BS signal, the correlation output from the second preamble correlator 405 is 0. Therefore, even though the MS receives signals from the BS and the RS simultaneously, it can distinguish the signals.

FIGS. 5 to 10 reveal that orthogonality is maintained irrespective of the number of preamble sequences forming a preamble signal.

Figure 11:
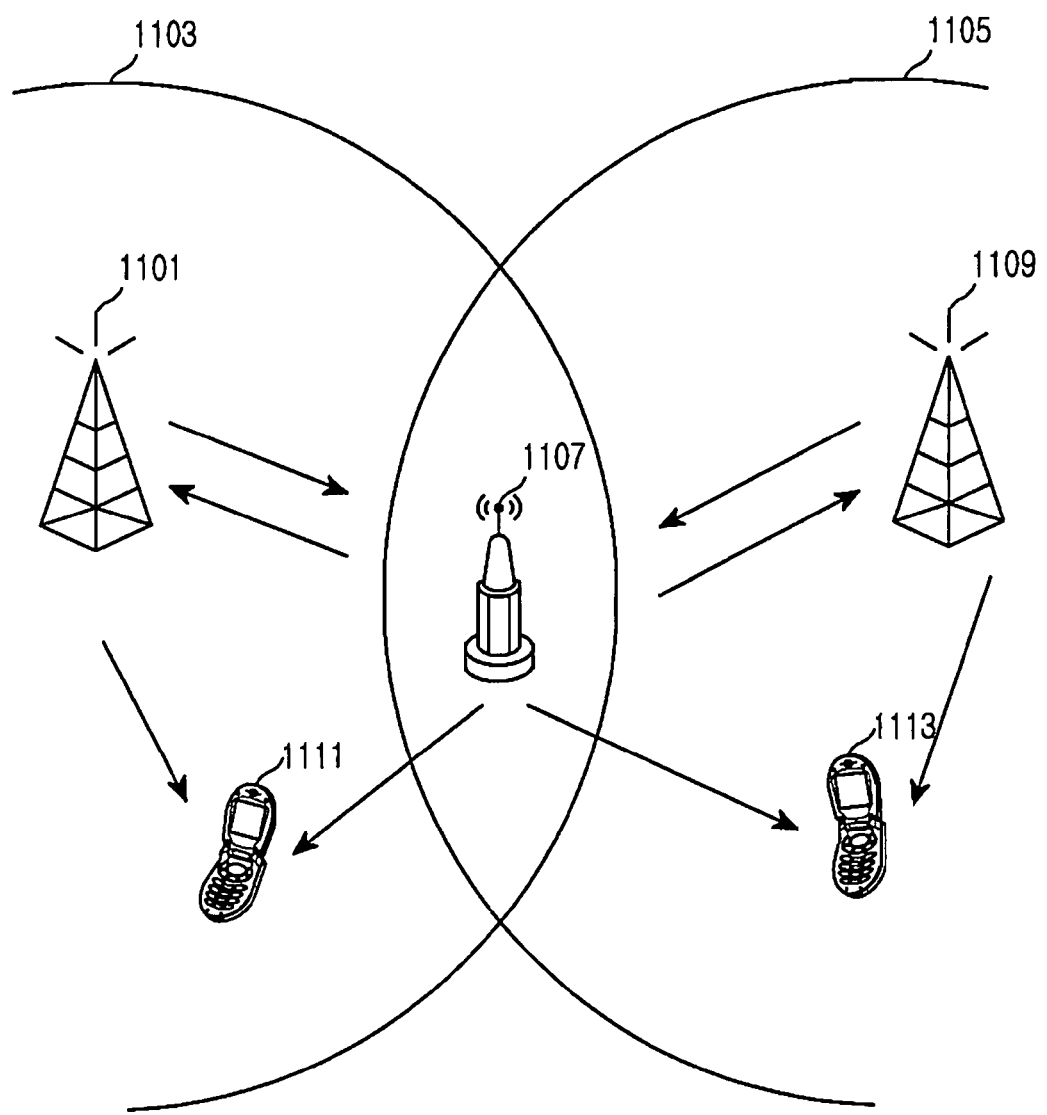
FIG. 11 illustrates signal links for MSs within two cells according to the present invention.

FIG. 11 illustrates signal links for MSs within two cells according to the present invention.

Referring to FIG. 11, when MSs 1111 and 1113 within two cells 1103 and 1105 receive signals from an RS 1107 and BSs 1101 and 1109, they can identify the RS 1107 and the BSs 1101 and 1109 through the first and second preamble correlators 403 and 405.

The preamble signals of the BSs 1101 and 1109 are the same or mutually orthogonal. When the MSs 1111 and 1113 send signals on the uplink, they may also send their orthogonal preamble signals.

Figure 12:
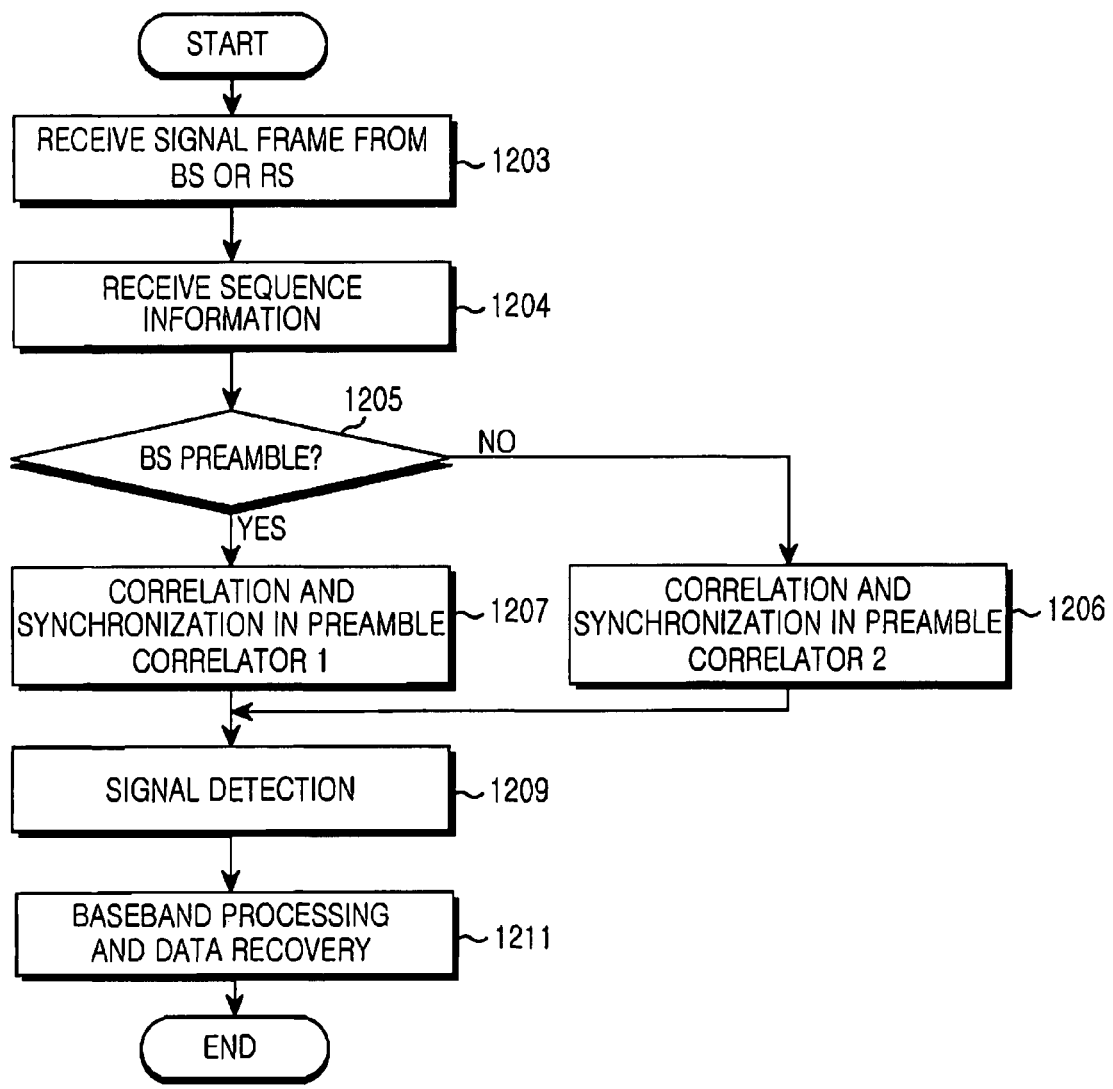
FIG. 12 illustrates an operation of an MS for processing a signal received from a BS or an RS according to the present invention.

FIG. 12 illustrates an operation of the MS for processing a signal received from the BS or the RS according to the present invention.

Referring to FIG. 12, the MS receives a signal frame from the BS or the RS in step 1203. If the BS generates the signal frame, it includes its preamble signal in the signal frame. If the RS generates the signal frame, it includes its preamble signal orthogonal to the preamble signal of the BS in the signal frame.

The preamble correlators 403 and 405 of the MS receive preamble sequence information from the sequence reference block 407 in step 1204. The preamble sequence information may be preset or received and stored before synchronization.

If the signal frame includes the preamble signal of the BS in step 1205, the first preamble correlator 403 acquires system synchronization by correlating the signal frame with the preamble signal of the BS in step 1207. Then the MS detects the BS signal in step 1209 and recovers the data of the signal frame by baseband signal processing of the detected BS signal through the baseband processor 401 instep 1211.

If the signal frame includes the preamble signal of the RS in step 1205, the second preamble correlator 405 acquires system synchronization by correlating the signal frame with the preamble signal of the RS in step 1206. Then the MS detects the RS signal in step 1209 and recovers the data of the signal frame by baseband signal processing of the detected RS signal through the baseband processor 401 in step 1211.

Then, the MS ends the algorithm of the present invention.

Figure 13:
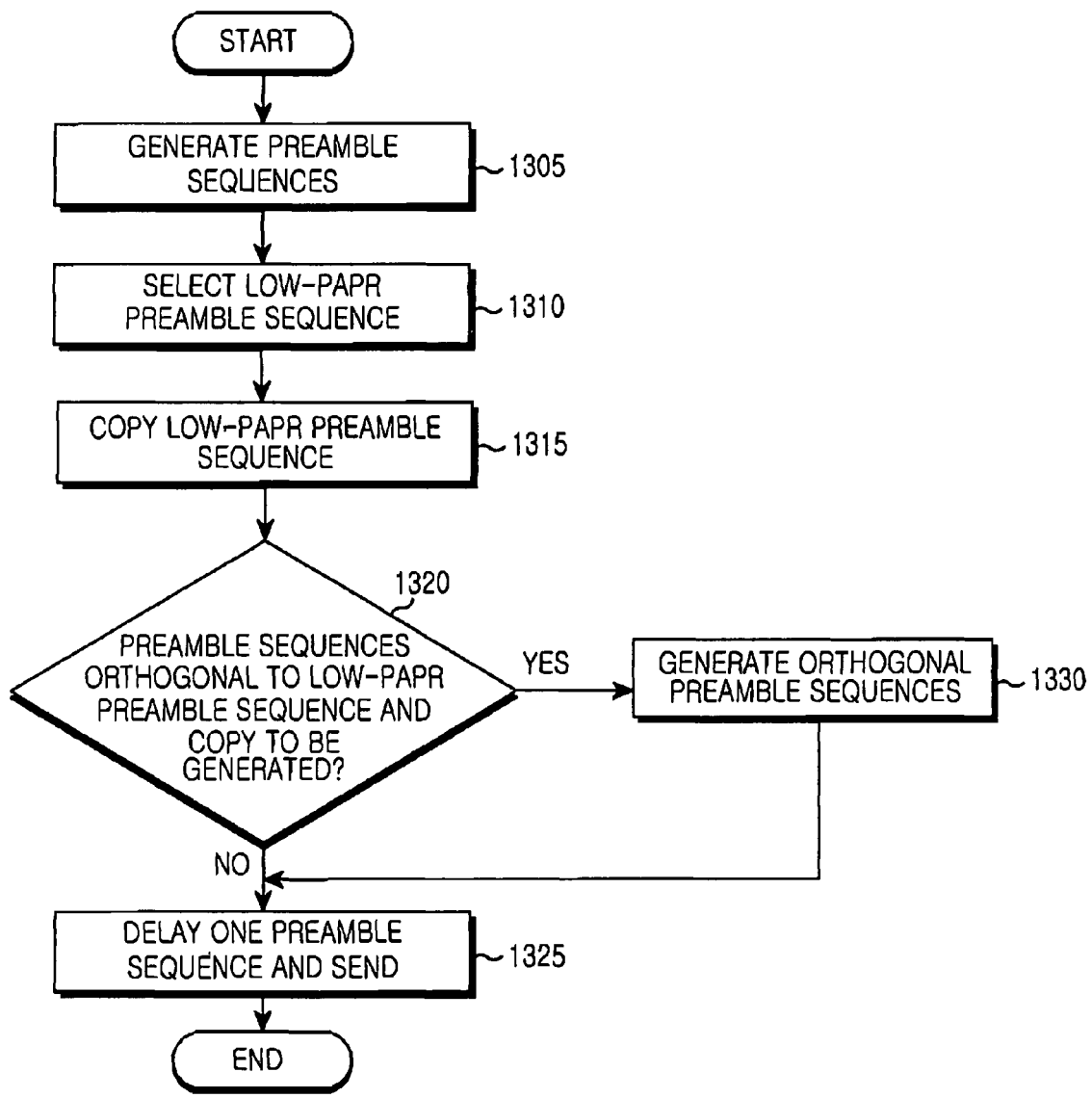
FIG. 13 illustrates an operation of the BS or the RS for generating an orthogonal preamble signal according to the present invention.

FIG. 13 illustrates an operation of the BS or the RS for generating an orthogonal preamble signal according to the present invention.

Referring to FIG. 13, the first preamble sequence generator 301 of the BS or the RS generates preamble sequences in step 1305. The low-PAPR preamble sequence selector 303 selects a low-PAPR preamble sequence from among the preamble sequences in step 1310. In step 1315, the preamble sequence copier 305 copies the low-PAPR preamble sequence.

If it is determined not to generate a preamble sequence orthogonal to the low-PAPR preamble sequence in step 1320, one of the low-PAPR preamble sequence and its copy is delayed in the buffer 311 in step 1325.

If it is determined to generate a preamble sequence orthogonal to the low-PAPR preamble sequence in step 1320, the orthogonal preamble sequence is generated using the complex conjugators 308 and 309, the sign converter 310 and the switches 306 and 307 in step 1330.

Then the algorithm of the present invention ends.

As is apparent from the above description, the present invention generates an unlimited number of low-PAPR preamble signals in a BWA communication system using RSs. Therefore, orthogonal preamble signals can be allocated to BSs, RSs and MSs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter for signal detection in a wireless system, comprising:
    a first preamble sequence generator for generating preamble sequences;
    a low-Peak-to-Average Power Ratio (PAPR) preamble sequence selector for selecting a first low-PAPR preamble sequence from among the generated preamble sequences;
    a second preamble sequence generator for generating at least one second low-PAPR preamble sequence using the first low-PAPR preamble sequence, wherein the second preamble sequence generator comprises:
    a preamble sequence copier for copying the first low-PAPR preamble sequence at least once and outputting the first low-PAPR preamble sequence and the at least one copy;
    a complex conjugator for generating preamble sequences orthogonal to the first low-PAPR preamble sequence and the at least one copy by calculating complex conjugates of the first low-PAPR preamble sequence and the at least one copy.

2. The transmitter of claim 1, wherein one of the preamble sequences is used for one of frequency synchronization and time synchronization between a Relay Station (RS) and a Mobile Station (MS).

3. The transmitter of claim 1, wherein if the preamble sequence copier outputs two preamble sequences, preamble sequences generated in the transmitter are given as $$preamble_2 = \begin{pmatrix} T_1 & T_1 \\ -T_1^* & T_1^* \end{pmatrix}$$

where T denotes a preamble sequence.

4. The transmitter of claim 1, wherein if the preamble sequence copier outputs three preamble sequences, preamble sequences generated in the transmitter are given as $$preamble_3 = \begin{pmatrix} T_1 & T_1 & T_1 \\ -T_1^* & T_1^* & 0 \end{pmatrix}$$

where T denotes a preamble sequence.

5. The transmitter of claim 1, wherein if the preamble sequence copier outputs four or a greater even number of preamble sequences, preamble sequences generated in the transmitter are given as $$\text{If } A = \begin{pmatrix} T_1 & T_1 \\ -T_1^* & T_1^* \end{pmatrix}, preamble_n = (A \ \ldots \ )$$

where T denotes a preamble sequence, n is an even number equal to or greater than 4, and A occurs a half of n times, wherein for n=4, the preamble sequences are given as $$preamble_4 = \begin{pmatrix} T_1 & T_1 & T_1 & T_1 \\ -T_1^* & T_1^* & -T_1^* & T_1^* \end{pmatrix}.$$

6. The transmitter of claim 1, wherein if the preamble sequence copier outputs five or a greater odd number of preamble sequences, preamble sequences generated in the transmitter are given as $$\text{If } A = \begin{pmatrix} T_1 & T_1 \\ -T_1^* & T_1^* \end{pmatrix}, preamble_n = \begin{pmatrix} A & \ldots & T_1 \\ & & 0 \end{pmatrix}$$

where T denotes a preamble sequence, n is an odd number equal to or larger than 5, and A occurs a half of (n−1) times,
wherein for n=5, the preamble sequences are given as $$preamble_5 = \begin{pmatrix} T_1 & T_1 & T_1 & T_1 & T_1 \\ -T_1^* & T_1^* & -T_1^* & T_1^* & 0 \end{pmatrix}.$$

7. A transmission method for signal detection in a transmitter of a wireless system, comprising:
 generating preamble sequences;
 selecting a first low-Peak-to-Average Power Ratio (PAPR) preamble sequence from among the generated preamble sequences; and
 generating at least one second low-PAPR preamble sequence using the first low-PAPR preamble sequence, by
 copying the first low-PAPR preamble sequence at least once;
 outputting the first low-PAPR preamble sequence and at least one copy; and
 generating preamble sequences orthogonal to the first low-PAPR preamble sequence and the at least one copy by complex-conjugating the first low-PAPR preamble sequence and the at least one copy.

8. The transmission method of claim 7, wherein if the outputting step outputs two low-PAPR preamble sequences, preamble sequences satisfying orthogonality are given as $$preamble_2 = \begin{pmatrix} T_1 & T_1 \\ -T_1^* & T_1^* \end{pmatrix}$$

where T denotes a preamble sequence.

9. The transmission method of claim 7, wherein if the outputting step outputs three low-PAPR preamble sequences, preamble sequences satisfying orthogonality are given as $$preamble_3 = \begin{pmatrix} T_1 & T_1 & T_1 \\ -T_1^* & T_1^* & 0 \end{pmatrix}$$

where T denotes a preamble sequence.

10. The transmission method of claim 7, wherein if the outputting step outputs four or a greater even number of preamble sequences, preamble sequences satisfying orthogonality are given as $$\text{If } A = \begin{pmatrix} T_1 & T_1 \\ -T_1^* & T_1^* \end{pmatrix}, preamble_n = (A \ \ldots \ )$$

where T denotes a preamble sequence, n is an even number equal to or greater than 4, and A occurs a half of n times, wherein for n=4, the preamble sequences are given as $$preamble_4 = \begin{pmatrix} T_1 & T_1 & T_1 & T_1 \\ -T_1^* & T_1^* & -T_1^* & T_1^* \end{pmatrix}.$$

11. The transmission method of claim 7, wherein if the outputting step outputs five or a greater odd number of preamble sequences, preamble sequences satisfying orthogonality are given as $$\text{If } A = \begin{pmatrix} T_1 & T_1 \\ -T_1^* & T_1^* \end{pmatrix}, preamble_n = \begin{pmatrix} A & \ldots & T_1 \\ & & 0 \end{pmatrix}$$

where T denotes a preamble sequence, n is an odd number equal to or greater than 5, and A occurs a half of (n−1) times,
wherein for n=5, the preamble sequences are given as $$preamble_5 = \begin{pmatrix} T_1 & T_1 & T_1 & T_1 & T_1 \\ -T_1^* & T_1^* & -T_1^* & T_1^* & 0 \end{pmatrix}.$$

\* \* \* \* \*